United States Patent
Yokoyama et al.

(10) Patent No.: US 11,173,790 B2
(45) Date of Patent: Nov. 16, 2021

(54) WIRE SUPPORTING STRUCTURE SUPPORTING ELECTRIC WIRE EXTENDING BETWEEN BOGIE AND CARBODY IN RAILCAR AND METHOD OF CONNECTING ELECTRIC WIRE

(71) Applicant: KAWASAKI JUKOGYO KABUSHIKI KAISHA, Kobe (JP)

(72) Inventors: Mitsuru Yokoyama, Kobe (JP); Kazuya Tanigawa, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 380 days.

(21) Appl. No.: 16/283,220

(22) Filed: Feb. 22, 2019

(65) Prior Publication Data

US 2019/0255951 A1 Aug. 22, 2019

(30) Foreign Application Priority Data

Feb. 22, 2018 (JP) .............................. JP2018-029834

(51) Int. Cl.
*B60L 5/38* (2006.01)
*B60L 13/00* (2006.01)

(52) U.S. Cl.
CPC ............... *B60L 5/38* (2013.01); *B60L 13/006* (2013.01); *B60L 2200/26* (2013.01)

(58) Field of Classification Search
CPC ....... B60L 5/38; B60L 13/006; B60L 2200/26
See application file for complete search history.

(56) References Cited

U.S. PATENT DOCUMENTS

| 8,757,403 | B2 * | 6/2014 | Yoshida | ................... | B61G 7/10 |
| | | | | | 213/50 |
| 9,583,925 | B2 * | 2/2017 | Hamada | ................. | H02G 3/088 |
| 2012/0298609 | A1 * | 11/2012 | Yoshida | ................. | B61G 11/08 |
| | | | | | 213/7 |
| 2016/0185363 | A1 * | 6/2016 | Nishimura | ................ | F16F 9/05 |
| | | | | | 105/199.1 |
| 2016/0197462 | A1 * | 7/2016 | Hamada | ................. | H02G 3/088 |
| | | | | | 174/50 |
| 2019/0255951 | A1 * | 8/2019 | Yokoyama | ............. | B61D 17/00 |

FOREIGN PATENT DOCUMENTS

JP         H02-82664 U      6/1990

* cited by examiner

*Primary Examiner* — Jason C Smith
(74) *Attorney, Agent, or Firm* — Oliff PLC (57) ABSTRACT

A wire supporting structure supporting an electric wire extending between a bogie and a carbody in a railcar includes: a support supported by the carbody and including a fitted portion; a carbody-side coupling device supported by the carbody; an electric wire connected to an electrical apparatus of the bogie; an electric wire-side coupling device provided at a tip end of the electric wire and connected to the carbody-side coupling device; and a bracket connected to a part of the electric wire, the part being located close to the electric wire-side coupling device, the bracket including a fitting portion fitted to the fitted portion of the support, the bracket being supported by the support with the fitting portion fitted in the fitted portion.

10 Claims, 8 Drawing Sheets

WIRE SUPPORTING STRUCTURE SUPPORTING ELECTRIC WIRE EXTENDING BETWEEN BOGIE AND CARBODY IN RAILCAR AND METHOD OF CONNECTING ELECTRIC WIRE

CROSS-REFERENCE TO RELATED APPLICATION

This application claims priority to and the benefit of Japanese Patent Application No. 2018-029834 filed on Feb. 22, 2018 with the Japan Patent Office, the entire disclosure of which is incorporated herein by reference.

BACKGROUND OF THE INVENTION

1. Field of the Invention

The present disclosure relates to a wire supporting structure supporting an electric wire extending between a bogie and a carbody in a railcar and a method of connecting the electric wire.

2. Description of the Related Art

In a railcar, in order to connect an electrical apparatus of a bogie to an underfloor apparatus of a carbody, an electric wire connected to the electrical apparatus of the bogie is connected through a coupling device (for example, a connector or an electric connection box) to an electric wire arranged under a floor of the carbody.

When assembling or maintaining a car, a worker needs to perform work of connecting the coupling device in a low, narrow underfloor space under the carbody while lifting a tip end vicinity portion of the electric wire and supporting the weight of a part of the electric wire which part is located between a support tool and a tip end of the electric wire. Therefore, the workload is large. Especially, in consideration that the railcar travels through a curved section, the electric wire includes an extra-length portion for allowing relative displacements of the car and the bogie. Therefore, the weight of the above part of the electric wire between the support tool and the tip end of the electric wire is heavy. Further, the weight of the electric wire by which the electrical apparatus (especially, a traction motor) of the bogie is connected to the underfloor device of the carbody tends to be heavy. Therefore, problems are that the load of the worker is extremely large, and this leads to a decrease in accuracy of the connecting work.

SUMMARY OF THE INVENTION

An object of the present invention is to reduce the load of connecting work of a wire between a bogie and a carbody in a railcar.

A wire supporting structure supporting an electric wire extending between a bogie and a carbody in a railcar according to one aspect of the present invention includes: a support supported by the carbody and including a fitted portion; a carbody-side coupling device supported by the carbody; an electric wire connected to an electrical apparatus of the bogie; an electric wire-side coupling device provided at a tip end of the electric wire and connected to the carbody-side coupling device; and a bracket connected to a part of the electric wire, the part being located close to the electric wire-side coupling device, the bracket including a fitting portion fitted to the fitted portion of the support, the bracket being supported by the support with the fitting portion fitted in the fitted portion.

According to the above configuration, after a worker lifts the electric wire together with the electric wire-side coupling device and before the worker connects the electric wire-side coupling device to the carbody-side coupling device, the worker fits the fitting portion of the bracket, provided in the vicinity of the electric wire-side coupling device, to the fitted portion of the support. With this, the worker can make the carbody support the electric wire through the bracket and the support. Therefore, the worker can perform the work of connecting the electric wire-side coupling device to the carbody-side coupling device while making the carbody support the weight of the electric wire by simple work that is fitting work. Thus, the load of the wire connecting work between the bogie and the carbody can be significantly reduced.

The above object, other objects, features, and advantages of the present invention will be made clear by the following detailed explanation of preferred embodiments with reference to the attached drawings.

DESCRIPTION OF THE PREFERRED EMBODIMENTS

Hereinafter, an embodiment of the present disclosure will be explained with reference to the drawings. In the following explanation, a direction in which a railcar travels and a carbody extends is defined as a car longitudinal direction, and a crosswise direction perpendicular to the car longitudinal direction is defined as a car width direction. The car longitudinal direction is also referred to as a front-rear direction, and the car width direction is also referred to as a left-right direction.

Embodiment 1

Figure 1:
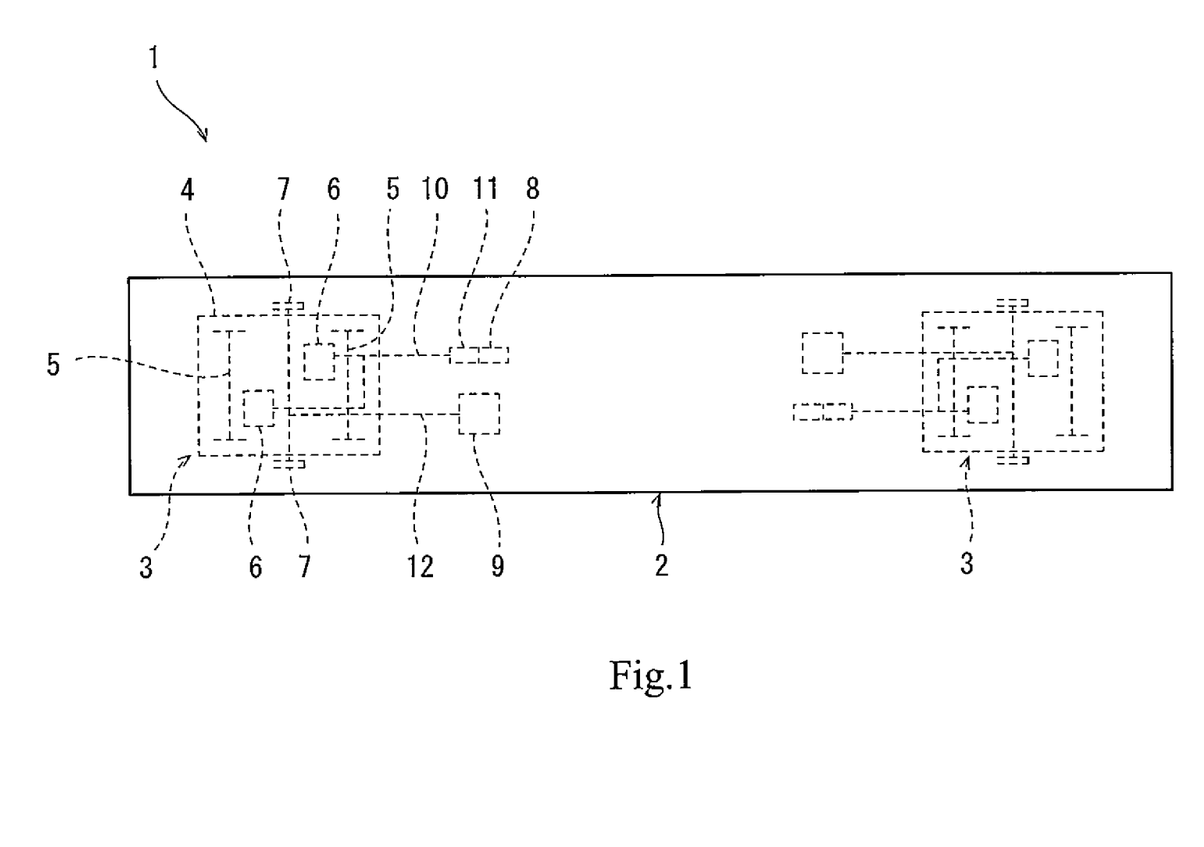
FIG. 1 is a schematic plan view of a railcar according to an embodiment.

FIG. 1 is a schematic plan view of a railcar 1 according to Embodiment 1. As shown in FIG. 1, the railcar 1 includes a carbody 2 and bogies 3 supporting the carbody 2 from below. Each of the bogies 3 includes a bogie frame 4, wheelsets 5, traction motors 6 (electrical apparatuses) configured to drive the wheelsets 5, and third rail type power collectors 7 (electrical apparatuses). Carbody-side connectors 8 and an electric connection box 9 are provided under a floor of the carbody 2 and supported by the carbody 2.

The bogie 3 is provided with feeder wires 10 connected to the traction motors 6, and electric wire-side connectors 11 (electric wire-side coupling devices) provided at tip ends of the feeder wires 10 are connected to the carbody-side connectors 8 (carbody-side coupling devices). Further, the bogie 3 is provided with collection wires 12 connected to the power collectors 7, and the collection wires 12 are connected to the electric connection box 9 (carbody-side coupling device). To be specific, in the railcar 1, the feeder wires 10 and the collection wires 12 extend between the carbody 2 and the bogie 3. It should be noted that the carbody-side connectors 8 and the electric connection box 9 are connected to underfloor apparatuses (not shown; for example, a transformer) of the carbody 2.

Figure 2:
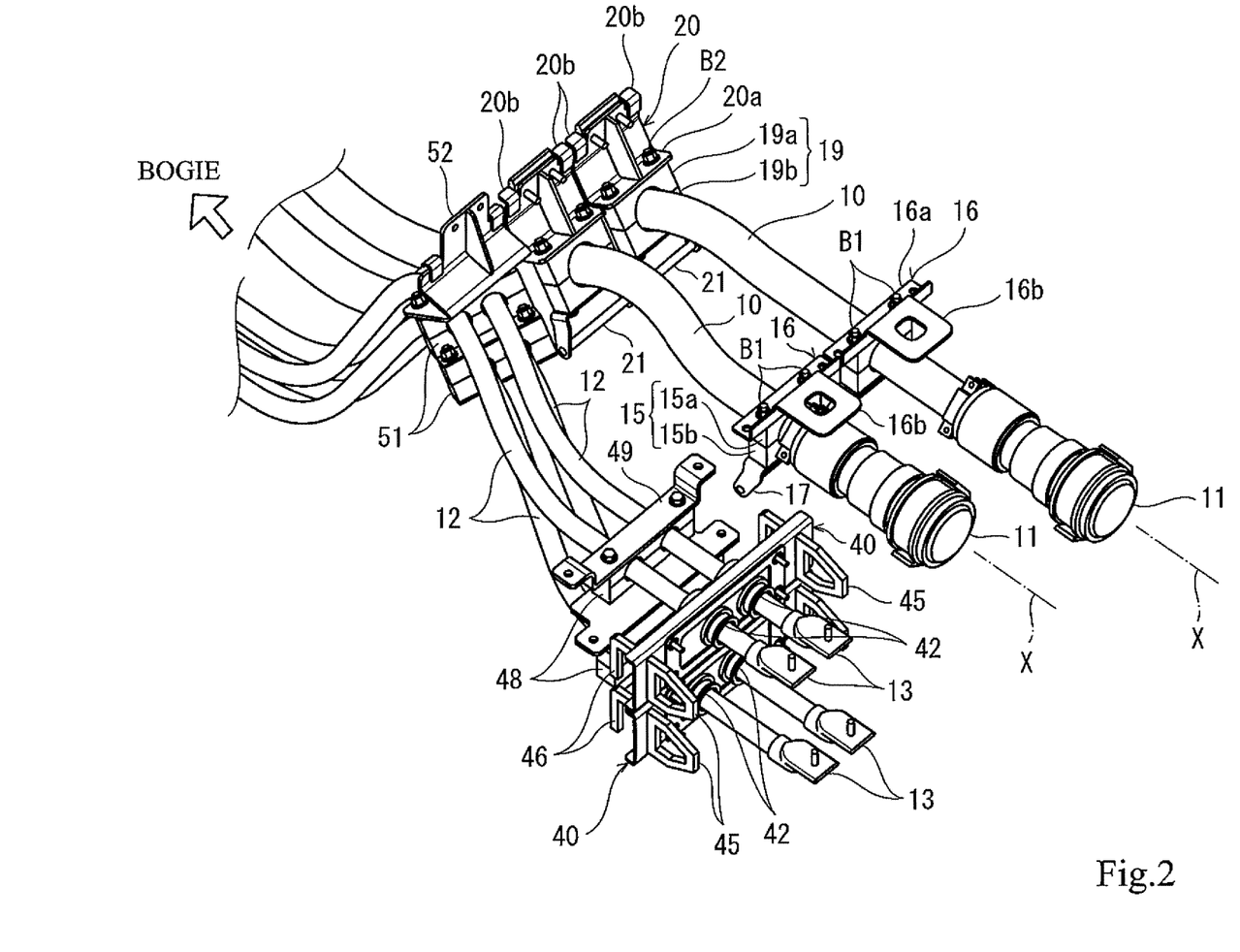
FIG. 2 is a perspective view of a wire structure between a carbody and a bogie in the railcar of FIG. 1.

FIG. 2 is a perspective view of a wire structure between the carbody 2 and the bogie 3 in the railcar 1 of FIG. 1. As shown in FIG. 2, as one example, the feeder wires 10 are constituted by two cables through which electric power is supplied to the two traction motors 6 (see FIG. 1) provided at each bogie, and each of the cables is formed by bundling and coating, for insulation, three-phase alternating current electric power wires. The collection wires 12 are constituted by four electric wires connected to the power collectors 7 (see FIG. 1) arranged at both respective sides of the bogie 3 in the car width direction. The electric wire-side connectors 11 fittingly connected to the carbody-side connectors 8 (see FIG. 1) are provided at respective carbody-side tip ends of the feeder wires 10. Terminals 13 (electric wire-side coupling devices) inserted into the electric connection box 9 (see FIG. 1) are provided at respective carbody-side tip ends of the collection wires 12.

Hereinafter, a wire supporting structure for the feeder wires 10 will be explained with reference to FIGS. 2 to 7, and a wire supporting structure for the collection wires 12 will be explained with reference to FIGS. 2, 8, and 9.

Wire Supporting Structure for Feeder Wires

As shown in FIG. 2, a first cleat 15 is attached to a carbody-side tip end portion (i.e., a portion close to the electric wire-side connector 11) of each feeder wire 10. The first cleat 15 includes a pair of sandwiching members 15a and 15b. The sandwiching members 15a and 15b sandwich the feeder wire 10 and are fastened to each other with bolts B1 (fastening members) to hold the feeder wire 10, and a first bracket 16 is also fastened to an upper surface of the first cleat 15 with the same bolts B1. The first bracket 16 includes an attaching portion 16a and a projecting portion 16b (fitting portion). The attaching portion 16a is connected to the feeder wire 10 through the first cleat 15 fastened with the bolts B1. The projecting portion 16b projects toward the carbody-side connector 8 beyond the attaching portion 16a.

The projecting portion 16b projects in parallel with a central axis X extending in a direction in which the electric wire-side connector 11 is fitted (connected) to the carbody-side connector 8. The projecting portion 16b is arranged above the electric wire-side connector 11. The projecting portion 16b is a horizontal plate. Tip-end corner portions of the projecting portion 16b are rounded or tapered. A first handle 17 held by the worker is fastened to a lower surface of the first cleat 15 with the same bolts B1.

A second cleat 19 is attached to an intermediate portion (i.e., a portion closer to the bogie 3 than the first cleat 15) of each feeder wire 10. The second cleat 19 includes a pair of sandwiching members 19a and 19b. The sandwiching members 19a and 19b sandwich the feeder wire 10 and are fastened to each other with bolts B2 to hold the feeder wire 10, and a second bracket 20 is also fastened to an upper surface of the second cleat 19 with the same bolts B2. The second bracket 20 includes an attaching portion 20a and projecting portions 20b. The attaching portion 20a is connected to the feeder wire 10 through the second cleat 19 fastened with the bolts B2. The projecting portions 20b project toward the bogie 3 beyond the attaching portion 20a. A second handle 21 held by the worker is fastened to a lower surface of the second cleat 19 with the same bolts B2.

Figure 3:
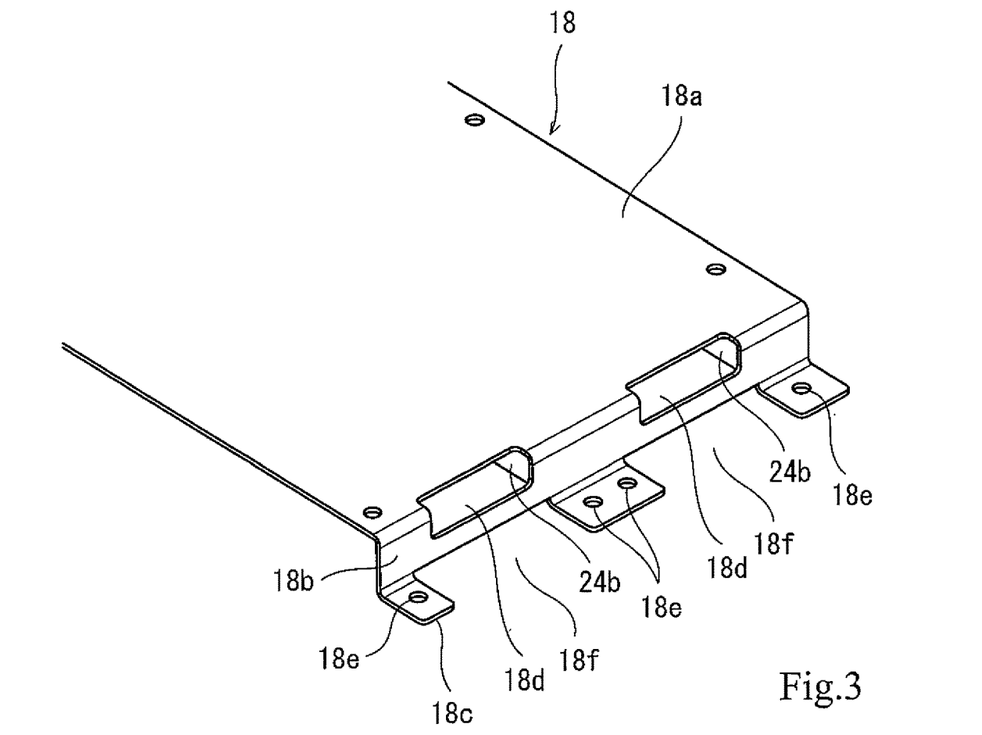
FIG. 3 is a perspective view when viewing a first support from above.
Figure 4:
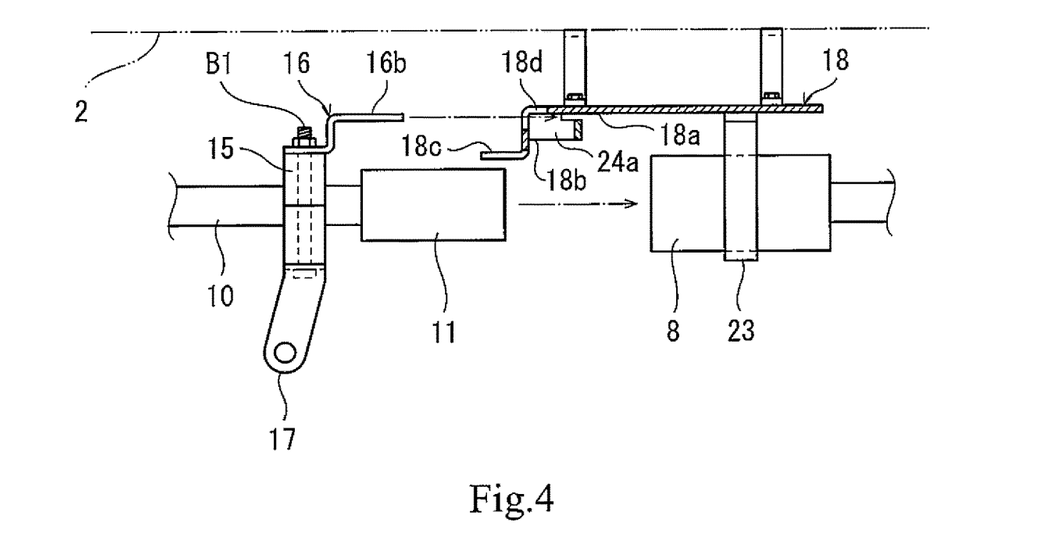
FIG. 4 is a side view for explaining work of attaching a first bracket for a feeder wire of FIG. 2 to the first support.

FIG. 3 is a perspective view when viewing a first support 18 from above. FIG. 4 is a side view for explaining work of attaching a first bracket 16 of FIG. 2 to the first support 18. As shown in FIGS. 3 and 4, the first support 18 supporting the carbody-side connectors 8 is fixed to the carbody 2. The first support 18 supported by the carbody 2 includes a flat plate portion 18a, a vertical plate portion 18b, and a flange portion 18c. The flat plate portion 18a is arranged above the carbody-side connectors 8 and extends in a horizontal direction. The vertical plate portion 18b projects downward from a bogie-side end edge of the flat plate portion 18a. The flange portion 18c projects in the horizontal direction from a lower end of the vertical plate portion 18b toward the bogie 3.

The first support 18 includes slit-shaped opening portions 18d (fitted portions). Each of the opening portions 18d is formed at or in the vicinity of a bent portion between the flat plate portion 18a and the vertical plate portion 18b and extends in the horizontal direction. The flange portion 18c includes bolt holes 18e for fixing the first brackets 16. The flange portion 18c further includes cutout portions 18f formed at positions corresponding to the opening portions 18d.

As shown in FIG. 4, a connector holder 23 is fixed to the first support 18, and the carbody-side connector 8 arranged under the flat plate portion 18a is held by the connector holder 23. The worker holds the first handle 17 and inserts (fits) the projecting portion 16b of the first bracket 16 into the opening portion 18d of the first support 18 from the bogie 3 side (the second bracket 20 side). As described above, the tip-end corner portions of the projecting portion 16b are rounded or tapered. Therefore, even if the projecting portion 16b is displaced relative to the opening portion 18d at the time of the above inserting work, the projecting portion 16b is easily inserted into the opening portion 18d.

By this work, the projecting portion 16b is brought into contact with a lower surface of the flat plate portion 18a, and the first bracket 16 is supported by the flat plate portion 18a and a periphery of the opening portion 18d. Thus, the tip end portion of the feeder wire 10 is supported by the first support 18 through the first cleat 15 and the first bracket 16, and therefore, the worker can release the first handle 17. To be specific, the first support 18 supports both the carbody-side connector 8 and the first bracket 16.

A direction in which the projecting portion 16b (fitting portion) of the first bracket 16 is inserted (fitted) into the opening portion 18d (fitted portion) of the first support 18 is the same as a direction in which the electric wire-side connector 11 is connected to the carbody-side connector 8. Therefore, when the projecting portion 16b of the first bracket 16 is inserted into the opening portion 18d of the first support 18, a center axis of the electric wire-side connector 11 naturally coincides with a center axis of the carbody-side connector 8. On this account, when the worker simply connects the electric wire-side connector 11 to the carbody-side connector 8, the electric wire-side connector 11 and the carbody-side connector 8 are appropriately fitted to each other.

Figure 5:
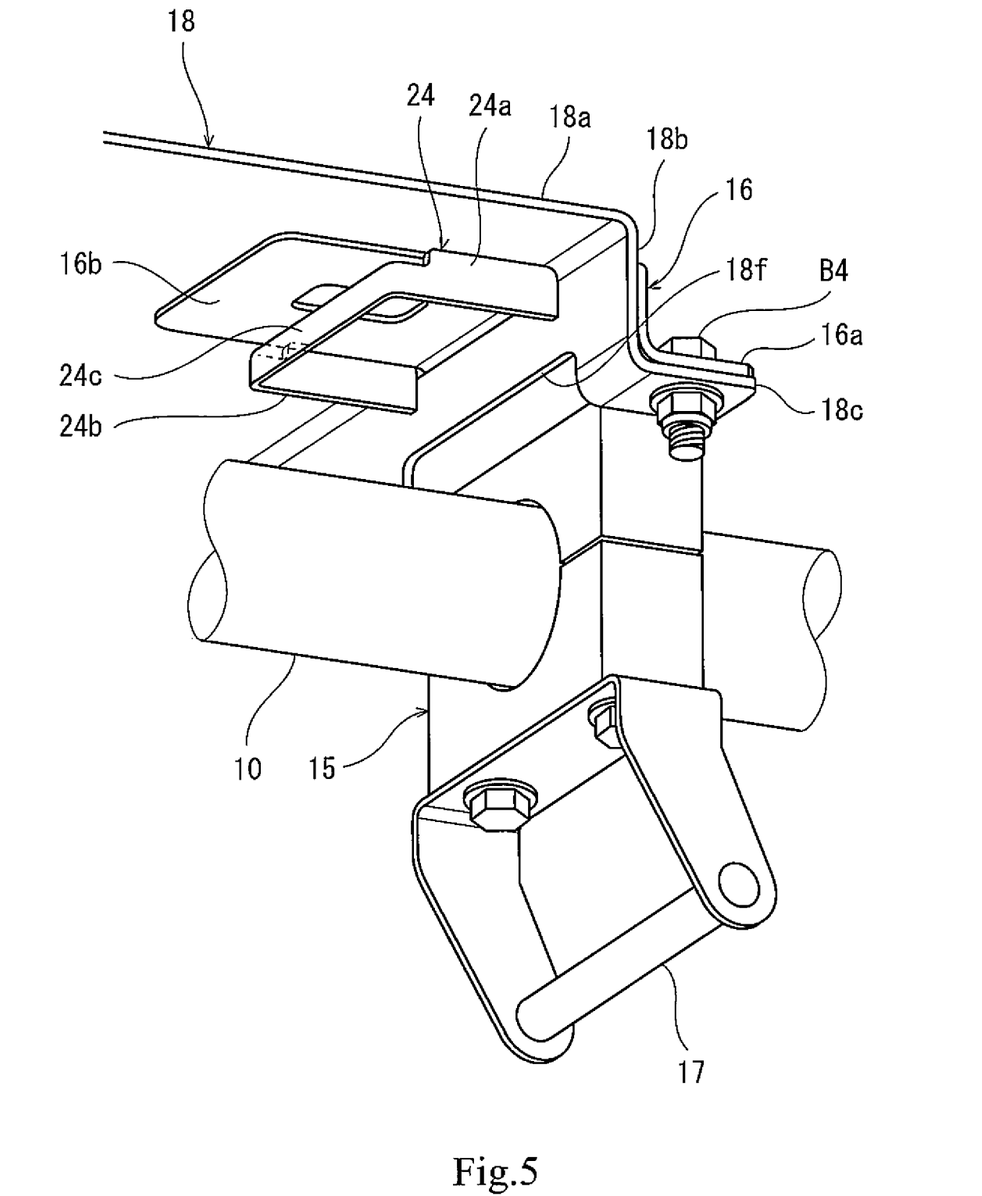
FIG. 5 is a perspective view when viewing, from below, the first support supporting the first bracket of FIG. 4.

FIG. 5 is a perspective view when viewing, from below, the first support 18 supporting the first bracket 16 of FIG. 4.

As shown in FIG. 5, a guide member 24 is fixed to the lower surface of the flat plate portion 18a of the first support 18. The guide member 24 guides both side ends of the projecting portion 16b inserted into the opening portion 18d. The guide member 24 includes a pair of guide portions 24a and 24b and a coupling portion 24c. The guide portions 24a and 24b are provided at both sides of the opening portion 18d and extend from an inner surface of the vertical plate portion 18b in a direction in which the projecting portion 16b is inserted. The coupling portion 24c couples tip ends of the guide portions 24a and 24b to each other. The coupling portion 24c is provided with a gap from the flat plate portion 18a so as not to interfere with the projecting portion 16b, and the gap is larger than the thickness of the projecting portion 16b.

Figure 6:
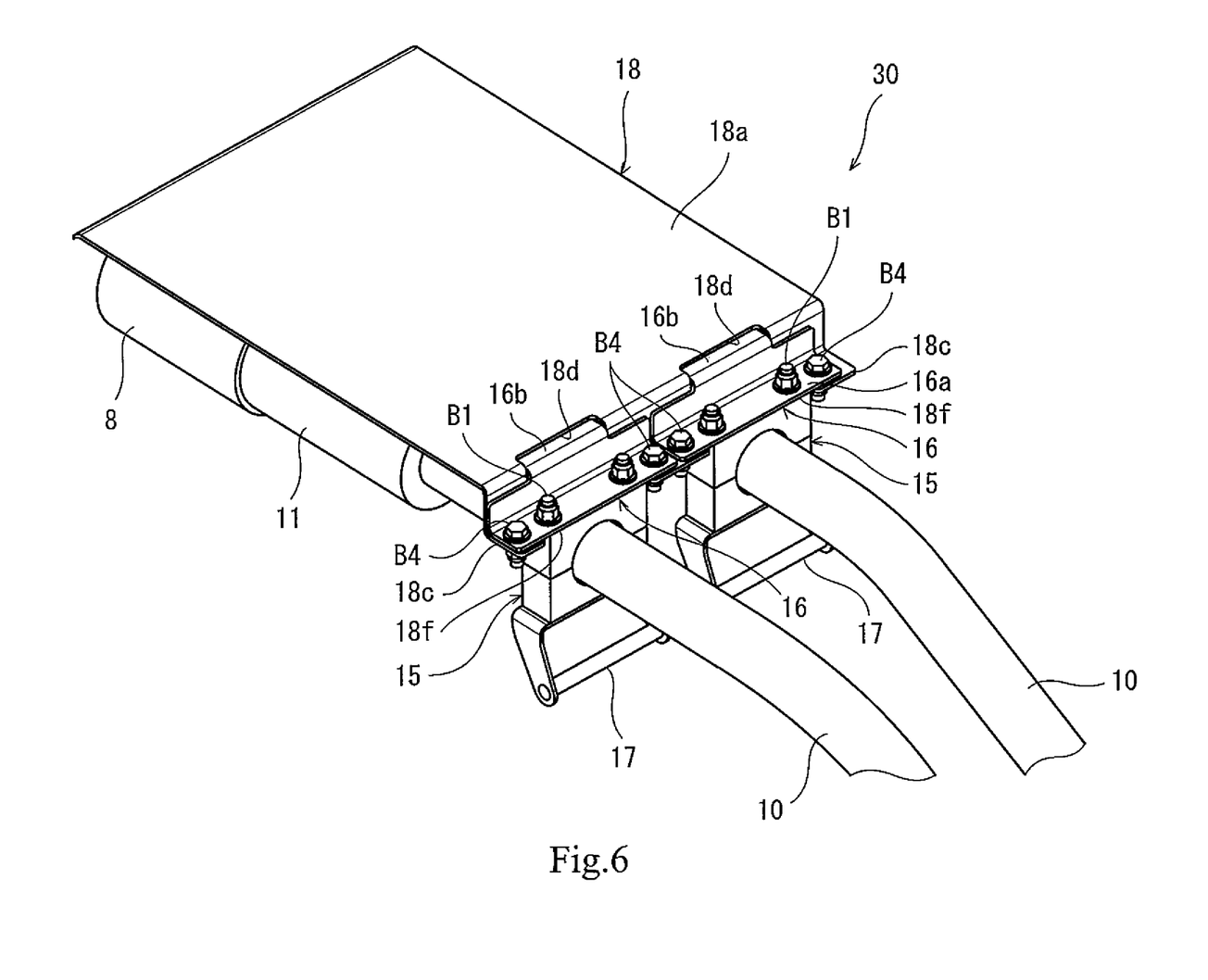
FIG. 6 is a perspective view showing an assembly completed state, i.e., a state where electric wire-side connectors of FIG. 2 are connected to carbody-side connectors.

FIG. 6 is a perspective view showing an assembly completed state, i.e., a state where the electric wire-side connectors 11 of FIG. 2 are connected to the carbody-side connectors 8. As shown in FIG. 6, parts of the attaching portion 16a of the first bracket 16 which parts project outward beyond the first cleat 15 are placed on the flange portion 18c of the first support 18 and fixed to the flange portion 18c with bolts B4. The first cleat 15 is arranged at the cutout portion 18f of the first support 18. With this, the first bracket 16 does not interfere with the flange portion 18c of the first support 18, and the projecting portion 16b of the first bracket 16 is inserted into the opening portion 18d of the first support 18.

Figure 7:
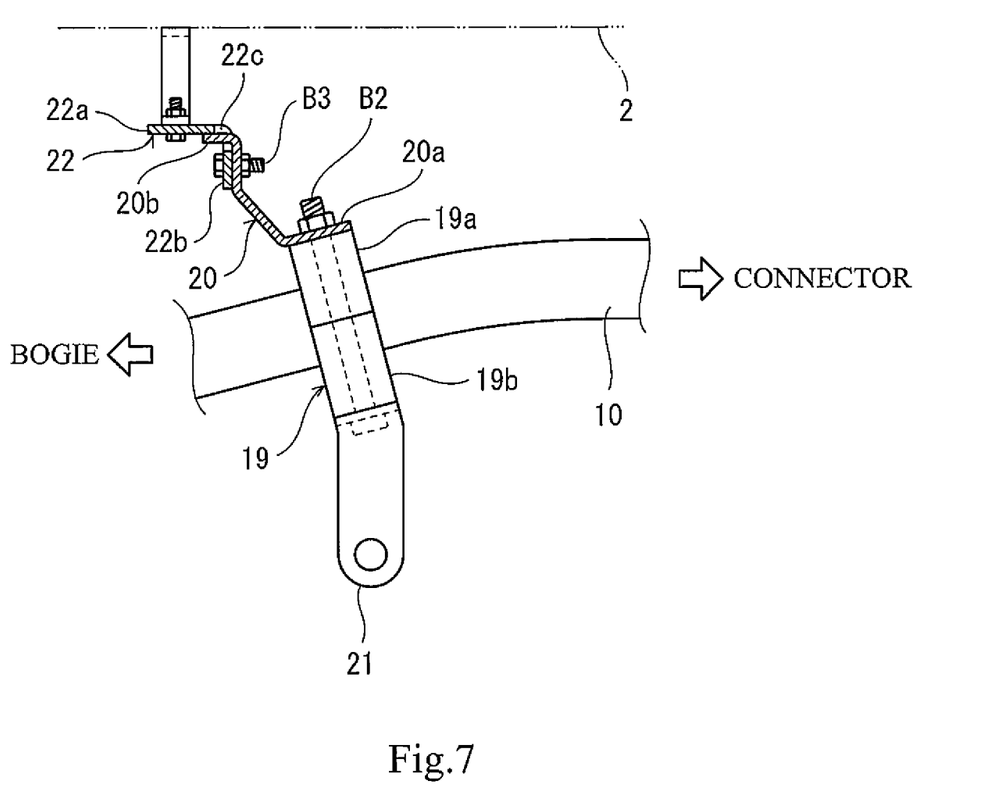
FIG. 7 is a longitudinal sectional view for explaining wok of attaching a second bracket of FIG. 2 to a second support.

FIG. 7 is a longitudinal sectional view for explaining work of attaching a second bracket 20 of FIG. 2 to a second support 22. As shown in FIG. 7, the second support 22 supporting the second bracket 20 is fixed to the carbody 2. The second support 22 includes a flat plate portion 22a, a vertical plate portion 22b, and slit-shaped opening portions 22c. The flat plate portion 22a extends in the horizontal direction. The vertical plate portion 22b projects downward from an end edge of the flat plate portion 22a. Each of the opening portions 22c is formed at or in the vicinity of a bent portion between the flat plate portion 22a and the vertical plate portion 22b and extends in the horizontal direction.

The worker holds the second handle 21 and inserts the projecting portions 20b of the second bracket 20 into the opening portions 22c of the second support 22 from the electric wire-side connector 11 side to make the carbody 2 support a part of the weight of the feeder wire 10. In this state, the second bracket 20 is fastened to the second support 22 with bolts B3. Thus, the intermediate portion of the feeder wire 10 is supported by the carbody 2 through the second cleat 19, the second bracket 20, and the second support 22. As above, the worker can perform the work of making the carbody 2 support the intermediate portion of the feeder wire 10 while making the carbody 2 support a part of the weight of the feeder wire 10 by simple work that is fitting work. With this, the load of the wire connecting work can be reduced.

As above, a wire supporting structure 30 for the feeder wires 10 between the bogie 3 and the carbody 2 is configured. According to the wire supporting structure 30, after the worker lifts the feeder wire 10 together with the electric wire-side connector 11 and before the worker connects the electric wire-side connector 11 to the carbody-side connector 8, the worker fits (inserts) the projecting portion 16b of the first bracket 16, provided in the vicinity of the electric wire-side connector 11, into the opening portion 18d of the first support 18. With this, the worker can make the carbody 2 support the weight of the feeder wire 10 for the traction motor 6 through the first bracket 16 and the first support 18. Therefore, the worker can perform the work of connecting the electric wire-side connector 11 to the carbody-side connector 8 while making the carbody 2 support the weight of the feeder wire 10 by simple work that is fitting work. Thus, the load of the wire connecting work between the bogie 3 and the carbody 2 can be significantly reduced.

The direction in which the projecting portion 16b is fitted into the opening portion 18d is the same as the direction in which the electric wire-side connector 11 is connected to the carbody-side connector 8. Therefore, when the projecting portion 16b of the first bracket 16 is fitted into the opening portion 18d of the first support 18, the electric wire-side connector 11 takes a posture appropriate for the connection of the electric wire-side connector 11 to the carbody-side connector 8. On this account, the electric wire-side connector 11 can be easily and appropriately connected to the carbody-side connector 8.

Further, while making the carbody 2 support the tip end vicinity portion of the feeder wire 10 through the first bracket 16 and the first support 18, the carbody 2 can be made to support, through the second bracket 20 and the second support 22, a part of the feeder wire 10 which part is located close to the bogie 3. Thus, the worker can easily handle the entire feeder wire 10.

Since the first support 18 by which the carbody 2 is made to support the carbody-side connector 8 also has a function of supporting the first bracket 16, the number of parts and the occupied space can be reduced. The weight of the feeder wire 10 acts to make the first bracket 16 incline using the periphery of the opening portion 18d of the first support 18 as a fulcrum, and this acts to make the projecting portion 16b incline upward. However, since the projecting portion 16b interferes with the lower surface of the flat plate portion 18a of the first support 18, the first support 18 can support the weight of the feeder wire 10 by the periphery of the opening portion 18d and the lower surface of the flat plate portion 18a. Thus, the first support 18 can support the heavy feeder wire 10 while having a simple configuration.

As described above, the first support 18 includes the guide member 24 which is provided at a lower side of the flat plate portion 18a and guides both side ends of the projecting portion 16b inserted into the opening portion 18d. Therefore, the electric wire-side connector 11 can be easily and appropriately connected to the carbody-side connector 8. Further, since the first bracket 16 is fastened to the first cleat 15 with the bolts B1, an increase in the number of parts can be suppressed.

Wire Supporting Structure for Collection Wires

Figure 8:
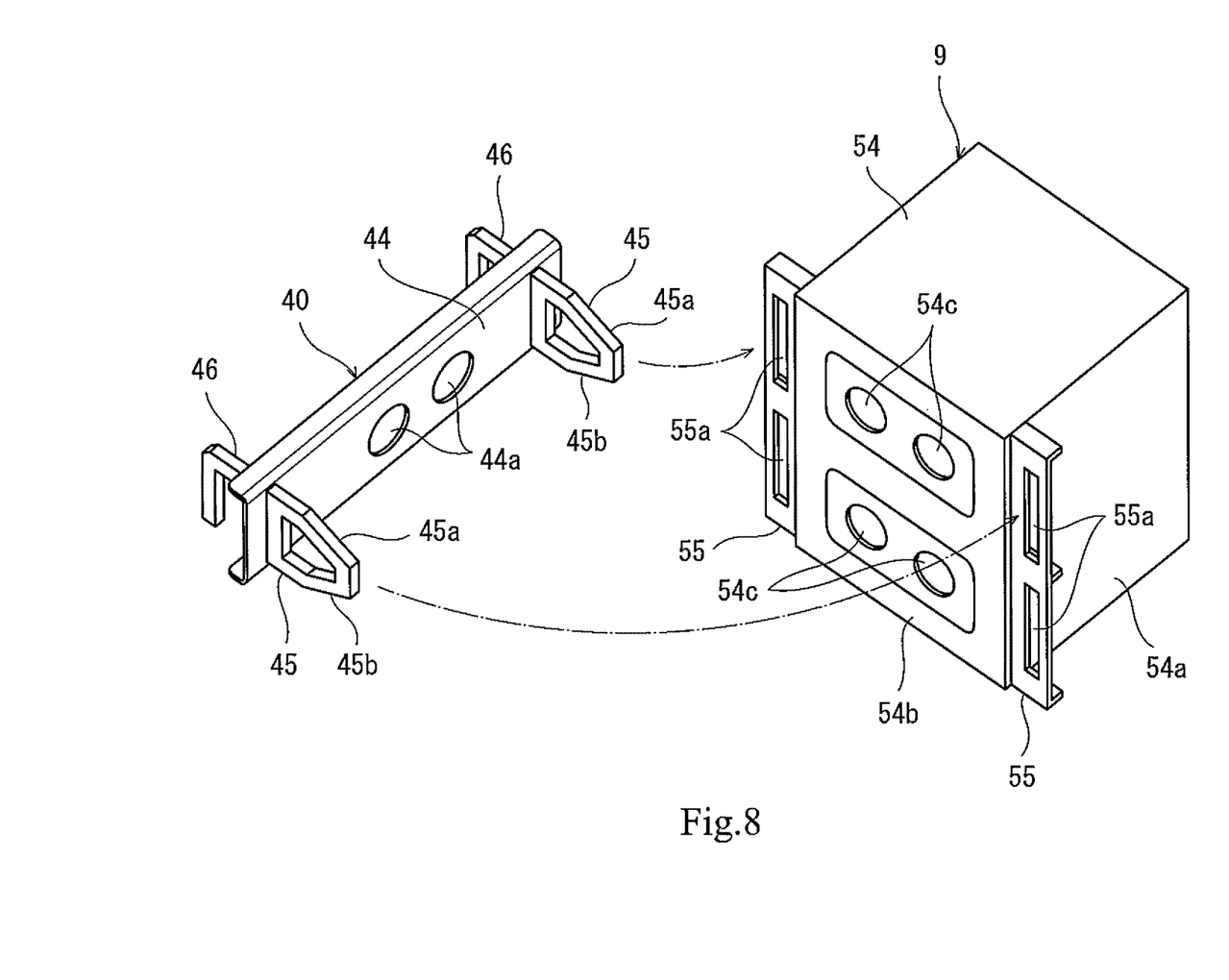
FIG. 8 is a perspective view showing a first bracket for collection wires of FIG. 2 and an electric connection box.
Figure 9:
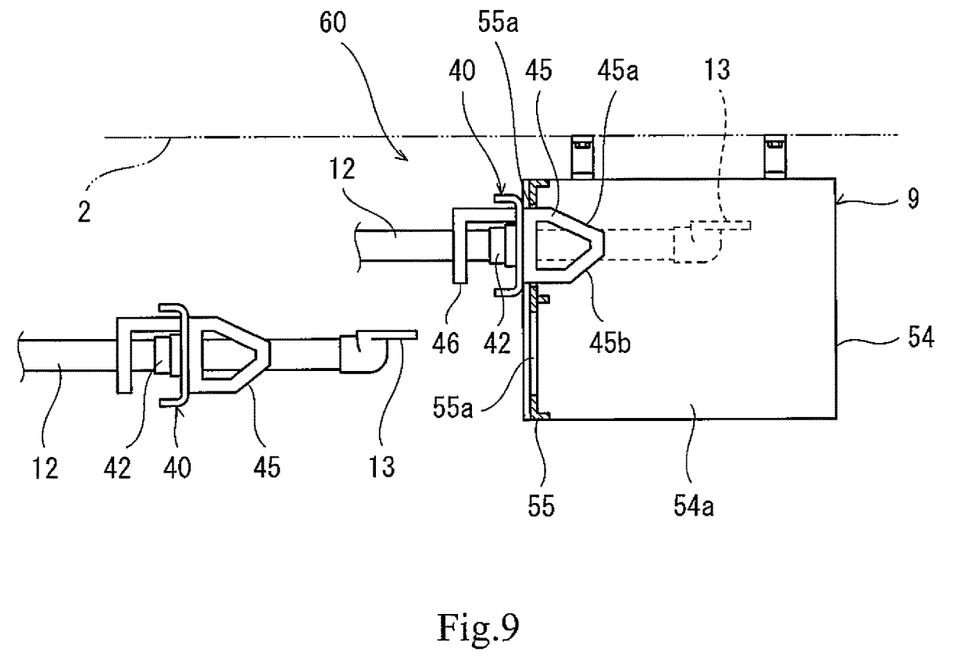
FIG. 9 is a side view for explaining work of attaching the first bracket of FIG. 8 to first supports.

FIG. 8 is a perspective view showing a first bracket 40 for the collection wires 12 of FIG. 2 and the electric connection box 9. FIG. 9 is a side view for explaining work of attaching the first bracket 40 of FIG. 8 to first supports 55. As shown in FIGS. 2, 8, and 9, cable glands 42 are attached to tip end portions (i.e., portions close to the terminals 13) of the collection wires 12. The cable glands 42 prevent water from flowing into the electric connection box 9. The cable glands 42 are attached to the first brackets 40. Each of the first brackets 40 includes a plate-shaped attaching portion 44, a pair of projecting portions 45 (fitting portions), and a pair of handle portions 46. The attaching portion 44 extends in a crosswise direction perpendicular to the axis of the collection wire 12. The projecting portions 45 project from both respective end portions of the attaching portion 44 toward the electric connection box 9. The handle portions 46 project from both respective end portions of the attaching portion 44 toward an opposite side of the projecting portions 45.

The attaching portion 44 includes a pair of fitting holes 44a to which a pair of cable glands 42 are fitted. The projecting portion 45 has a vertically long shape extending in a vertical direction and tapers toward its projecting end located close to the electric connection box 9. To be specific, an upper tapered portion 45a and a lower tapered portion 45b are provided at a tip end of the projecting portion 45. The upper tapered portion 45a is longer than the lower tapered portion 45b. The projecting portion 45 includes a lightening hole but does not have to include the lightening hole. The number of collection wires 12 is four. Two of the collection wires 12 are arranged at a lower stage, and the remaining two collection wires 12 are arranged at an upper stage. Each of the first brackets 40 arranged at the upper and lower stages holds two collection wires 12.

First cleats 48 are attached to tip end portions of the collection wire 12 so as to be located at a side of the first brackets 40 which side is close to the bogie 3. Each of the first cleats 48 includes a pair of sandwiching members 48a and 48b. The sandwiching members 48a and 48b sandwich the collection wires 12 and are fastened to each other with bolts B5 (fastening members) to hold the collection wires 12. A stay 49 fixed to the carbody 2 is fastened to an upper surface of the first cleat 48 with the same bolts B5.

The electric connection box 9 includes a box main body 54 and the first supports 55. The box main body 54 accommodates an electric connection circuit. The first supports 55 are fixed to a pair of side surfaces 54a of the box main body 54. A side surface 54b, located close to the bogie 3, of the box main body 54 includes insertion holes 54c into which the terminals 13 and the collection wires 12 are inserted. The number of insertion holes 54c is four. Two of the insertion holes 54c are arranged at a lower stage, and the remaining two insertion holes 54c are arranged at an upper stage. The first supports 55 project transversely from respective parts of the side surfaces 54a located at both sides of the side surface 54b including the insertion holes 54c, the parts being located close to the bogie 3. Each of the first supports 55 includes a pair of vertically long slit portions 55a (fitted portions) extending in the vertical direction and lined up in the vertical direction. The size of each slit portion 55a is set such that the projecting portion 45 of the first bracket 40 can be fitted to the slit portion 55a.

The worker holds the handle portions 46, inserts the terminals 13 into the insertion holes 54c of the electric connection box 9, and also inserts (fits) the projecting portions 45 of the first bracket 40 into the slit portions 55a of the first supports 55 from the bogie 3 side. A direction in which the projecting portion 45 (fitting portion) is inserted (fitted) into the slit portion 55a (fitted portion) is the same as a direction in which the terminal 13 is inserted into (connected to) the insertion hole 54c of the electric connection box 9. As described above, the upper tapered portion 45a and the lower tapered portion 45b are provided at the tip end of the projecting portion 45. Therefore, even if the projecting portion 45 is displaced relative to the slit portion 55a in the vertical direction at the time of the above inserting work, the projecting portion 45 is easily inserted into (fitted to) the slit portion 55a.

By this work, the projecting portion 45 is brought into contact with and supported by a periphery of the slit portion 55a of the first support 55. Thus, the first bracket 40 is supported by the first supports 55. The first supports 55 are supported by the carbody 2 through the electric connection box 9. With this, the tip end portions of the collection wires 12 are supported by the carbody 2 through the cable glands 42, the first bracket 40, the first supports 55, and the electric connection box 9, and therefore, the worker can release the handle portions 46.

A second cleat 51 is attached to intermediate portions (i.e., portions closer to the bogie 3 than the first cleat 48) of the collection wires 12. The second cleat 51 includes a pair of sandwiching members 50a and 50b. The sandwiching members 50a and 50b sandwich the collection wires 12 and are fastened to each other with bolts B6 to hold the collection wires 12. A second bracket 52 is fastened to an upper surface of the second cleat 51 with the same bolts B6. Since a structure for making the carbody 2 support the second bracket 52 for the collection wires 12 is the same as the structure for making the carbody 2 support the second bracket 20 for the feeder wire 10, a detailed explanation thereof is omitted.

As above, a wire supporting structure 60 for the collection wires 12 between the bogie 3 and the carbody 2 is configured. According to the wire supporting structure 60, after the worker lifts the collection wires 12 together with the terminals 13 and before the worker connects the terminals 13 and the like to the electric connection box 9, the worker fits the projecting portions 45 of the first brackets 40, provided in the vicinity of the terminals 13, into the slit portions 55a of the first supports 55. With this, the worker can make the carbody 2 support the collection wires 12 through the first brackets 40 and the first supports 55. Therefore, the worker can perform the work of connecting the terminals 13 and the like to the electric connection box 9 while making the carbody 2 support the weight of the collection wires 12 by simple work that is fitting work. Thus, the load of the wire connecting work between the bogie 3 and the carbody 2 can be significantly reduced.

The direction in which the projecting portion 45 is fitted into the slit portion 55a is the same as the direction in which the terminal 13 is inserted into the electric connection box 9. Therefore, the above fitting work and the above inserting work can be performed by a single action. Further, since the first supports 55 are provided at the electric connection box 9, variations in accuracy of relative positions of the slit portions 55a and the projecting portions 45 can be reduced. Furthermore, since the first supports 55 are supported by the carbody 2 through the electric connection box 9, the first supports 55 can be downsized.

Since the first supports 55 are fixed to both respective side surfaces 54a of the electric connection box 9, the collection wires 12 are stably supported from left and right sides. Since the slit portions 55a of the first supports 55 arranged at both sides of the electric connection box 9 are vertically long, the load can be supported by the slit portions 55a having high section modulus. In addition, the length of projection of the first support 55 from the electric connection box 9 to a transverse side can be suppressed, and therefore, the occupied space can be reduced.

The present invention is not limited to the above embodiment, and modifications, additions, and eliminations may be made with respect to the configuration of the present invention. For example, regarding the structure of fitting the first bracket 16, 40 to the first support 18, 55 in the above embodiment, the fitting portion of the first bracket 16, 40 serves as a male member, and the fitted portion of the first support 18, 55 serves as a female member. However, the male member and the female member may be reversed. In the above embodiment, the carbody-side connector 8 and the electric connection box 9 are explained as the carbody-side coupling devices, and the electric wire-side connector 11 and the terminal 13 are explained as the electric wire-side coupling devices. However, a different device may be used as long as the device detachably connects members to each other. The bogie does not have to include the third rail type power collectors 7. In this case, the collection wires 12 do not exist, so that only the wire supporting structure for the feeder wires 10 for the traction motors 6 is adopted. The above embodiment has explained the structure of making the carbody 2 support the intermediate portions of the feeder wires 10 and the intermediate portions of the collection wires 12 through the second brackets 20 and 52. However, only the tip end portions of the electric wires may be supported by the carbody 2 through the first brackets 16 and 40 without making the carbody 2 support the intermediate portions of the electric wires.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the scope of the present invention.

What is claimed is:

1. A wire supporting structure supporting an electric wire extending between a bogie and a carbody in a railcar, the wire supporting structure comprising:
    a support supported by the carbody and including a fitted portion;
    a carbody-side coupling device supported by the carbody;
    an electric wire connected to an electrical apparatus of the bogie;
    an electric wire-side coupling device provided at a tip end of the electric wire and electrically connected to the carbody-side coupling device; and
    a bracket connected to a part of the electric wire, the part being located close to the electric wire-side coupling device, the bracket including a fitting portion fitted to the fitted portion of the support, the bracket being supported by the support with the fitting portion fitted in the fitted portion.

2. The wire supporting structure according to claim 1, wherein a direction in which the fitting portion is fitted to the fitted portion is the same as a direction in which the electric wire-side coupling device is connected to the carbody-side coupling device.

3. The wire supporting structure according to claim 1, wherein:
    the support is a first support; and
    the bracket is a first bracket,
    the wire supporting structure further comprising:
        a second support supported by the carbody and located closer to the bogie than the first support; and
        a second bracket supported by the second support and connected to a part of the electric wire, the part being located closer to the bogie than the first bracket.

4. The wire supporting structure according to claim 1, wherein:
    the electrical apparatus is a traction motor;
    the electric wire is a feeder wire connected to the traction motor;
    the carbody-side coupling device is a carbody-side connector;
    the electric wire-side coupling device is an electric wire-side connector fitted to the carbody-side connector; and
    the support supports both the carbody-side connector and the bracket.

5. The wire supporting structure according to claim 4, wherein:
    the support includes
        a flat plate portion arranged above the carbody-side connector,
        a vertical plate portion projecting downward from an end edge of the flat plate portion, the end edge being located close to the bogie, and
        an opening portion that is open at or in the vicinity of a bent portion between the vertical plate portion and the flat plate portion;
    the bracket includes
        an attaching portion connected to the feeder wire, and
        a projecting portion projecting toward the carbody-side connector beyond the attaching portion;
    the fitted portion is the opening portion;
    the fitting portion is the projecting portion; and
    the projecting portion is inserted into the opening portion to contact a lower surface of the flat plate portion.

6. The wire supporting structure according to claim 5, wherein the support includes a pair of guide portions provided at a lower side of the flat plate portion and configured to guide both side ends of the projecting portion inserted into the opening portion.

7. The wire supporting structure according to claim 1, further comprising:
    a cleat supporting a part of the electric wire, the part being located close to the electric wire-side coupling device, wherein
    the bracket is fastened to the cleat with a fastening member.

8. The wire supporting structure according to claim 1, wherein:
    the electrical apparatus is a third rail type power collector;
    the electric wire is a collection wire connected to the power collector;
    the carbody-side coupling device is an electric connection box;
    the electric wire-side coupling device is a terminal inserted into the electric connection box; and
    the support is provided at the electric connection box and supported by the carbody through the electric connection box.

9. The wire supporting structure according to claim 8, wherein:
    the support is fixed to both side surfaces of the electric connection box;
    the fitted portion comprises vertically long slit portions formed at the support;
    the bracket includes
        an attaching portion connected to the collection wire, and
        vertically long projecting portions projecting from both end portions of the attaching portion toward the slit portions; and
    the fitting portion comprises the projecting portions.

10. A method of connecting an electric wire extending between a bogie and a carbody in a railcar, the method comprising:
    fitting a fitting portion of a bracket to a fitted portion of a support supporting a carbody-side coupling device to prevent an electric wire-side coupling device from falling, the bracket being connected to a part of the electric wire, the part being located close to the electric wire-side coupling device; and
    electrically connecting the electric wire-side coupling device and the carbody-side coupling device with the fitting portion fitted in the fitted portion.

* * * * *